Sept. 30, 1952 T. F. LLOYD, JR 2,611,985
FISHING FLY
Filed March 20, 1950
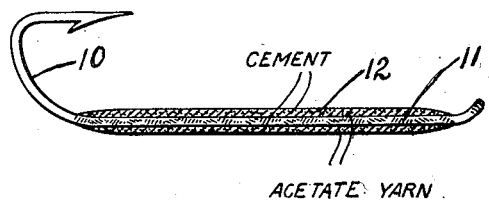
Fig. 1.
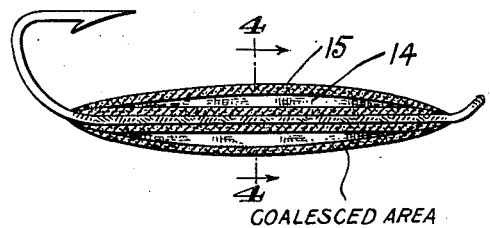
Fig. 2.
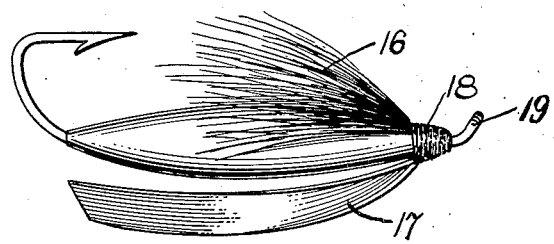
Fig. 3.
Fig. 4.
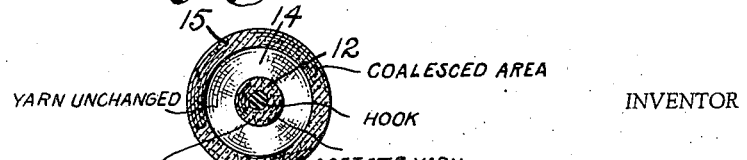
INVENTOR
Thomas F. Lloyd, Jr.
BY Wenderoth, Lind & Ponack
ATTORNEYS Patented Sept. 30, 1952

2,611,985

UNITED STATES PATENT OFFICE 2,611,985

FISHING FLY

Thomas F. Lloyd, Jr., Hartford, Conn.

Application March 20, 1950, Serial No. 150,721

2 Claims. (Cl. 43—42.25)

This invention relates to a fishing fly and especially to the body construction thereof which is suitable for wet or dry flies.

An object of the invention is to provide a fly which is exceedingly light and which will not absorb water when in use to a disadvantageous extent so that the fly may be accurately cast at all times.

A further object of the invention is to provide a construction which is able to withstand a plurality of catches without losing its shape or being torn as is at present the case with fly bodies constructed of silk, chenille, and the like.

A further object of the invention is to provide a body structure which is firmly fixed to the shank of the hook and is non-rotatable with respect thereto.

With the above and other objects in view which will become apparent from the detailed description below the invention is shown in the drawings wherein:

Fig. 1 is a longitudinal cross-sectional view with the hook shown in elevation illustrating the first steps in building the body;

Fig. 2 is a similar view showing the completed body;

Fig. 3 is a side view of a complete fly, and

Fig. 4 is a cross-sectional view taken upon section line 4—4 of Fig. 2 looking in the direction of the arrows.

In the various views similar reference characters indicate like parts.

In constructing the body a hook 10 of a size designed for the particular fish which are to be caught by the fly is roughened on its shank 11 by a file or the like without however, detracting from the strength thereof. Then a first layer 12 of an acetate yarn is wound upon the roughened portion of the shank and this layer is cemented by a lacquer or the like to the shank.

Then additional layers 14 of an acetate yarn are wound to the form desired upon the first layer 12. The size of the second layer will of course depend upon the size of the hook and also upon the type of fish for which the fly is to be used.

The next step in preparing the body is the dipping of the body so formed into a solvent for the acetate yarn in order to secure a coalescing of the outer layers of the yarn. Such a coalesced arrangement is indicated at 15.

Thereafter the outer surface which is now hard and firm is coated with any desired paint or coloring. The paint known as "Firelacquer" on the market is eminently suitable for this purpose. The body is now completed and the fly is finished by securing the hackle 16 thereto and the wings 17 by the silk thread 18. The gut is attached to the usual eyelet 19 of the hook.

If desired a tail may be secured to the butt.

With respect to the acetate yarn that may be used, any acetate yarn such as cellulose acetate and related plastic materials such as cellulose acetate butyrate and cellulose acetate propionate may be used.

With regard to solvents for the coalescing step many ketones and esters are suitable. Specific solvents that may be mentioned are ethyl acetate, dioxane, chloroform, carbon tetrachloride, diacetone alcohol, glacial acetic acid, phenol and some chlorinated solvents. However, the preferred solvent is acetone.

When acetone is used the time of immersion therein may vary from approximately ½ minute to 4 or 5 minutes depending upon the size of the body of acetate floss wound upon the shank of the hook. The length of immersion will also determine the extent of the depth of the coalesced area.

For a trout fly approximately 15 strands of acetate floss are used wherein each strand is about 4 feet long and composed of approximately 20 fibers. For flies for bass and larger fish a larger amount of floss or yarn is used and the time of immersion in the solvent will also vary somewhat so that a perfect coalescing of the outer layers may take place. It is believed that in the interior layers of the yarn will be confined which is advantageous for a dry fly.

As a general rule a period of 1 minute is sufficient to secure the results desired.

The body of the fly when constructed as set forth above for a wet fly is perfect in weight for wet fly fishing.

In certain cases it may be desirable to immerse the body sufficiently long in the acetone to allow the coalesced area to extend all the way to the cement upon the first layer of yarn.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

I claim:

1. A fishing fly comprising a shank, a cement coat on said shank, a first layer of acetate yarn surrounding and bound in said cement, a plurality of succeeding superimposed layers of acetate yarn wound upon said first layer, said succeeding layers being coalesced by a solvent extending substantially to said first layer.

2. A body for a fishing fly comprising a hook shank, said shank being roughened, a first layer of acetate yarn wound upon and secured to said roughened shank, a plurality of succeeding layers of acetate yarn wound upon said first layer in superposed relationship thereto, said layers of acetate yarn being coalesced by a solvent extending substantially to said shank.

THOMAS F. LLOYD, JR.

REFERENCES CITED

The following references are of record in the file of this patent:

UNITED STATES PATENTS

| Number | Name | Date |
|---|---|---|
| 1,640,599 | Conn | Aug. 30, 1927 |
| 1,657,734 | Wright et al. | Jan. 31, 1928 |
| 2,033,530 | Meinecke | Mar. 10, 1936 |
| 2,134,401 | Harvey | Oct. 25, 1938 |
| 2,148,799 | Bilinski | Feb. 28, 1939 |

FOREIGN PATENTS

| Number | Country | Date |
|---|---|---|
| 501,597 | Great Britain | Mar. 1, 1939 |